3,458,463
Patented July 29, 1969

3,458,463
PREPARATION OF PETROLEUM RESIN-DRYING OIL BINDERS AT REDUCED PRESSURE IN AN INERT ATMOSPHERE
Jean Guerrier, Rouen, France, assignor to Esso Standard Societe Anonyme Francaise, a French company
No Drawing. Filed May 31, 1966, Ser. No. 553,723
Claims priority, application France, May 28, 1965, 18,769
Int. Cl. C08f 37/00; C09d 3/74, 3/26
U.S. Cl. 260—23.7    4 Claims

ABSTRACT OF THE DISCLOSURE

A process for the preparation of binding agents which involves reacting a petroleum resin with a drying or semi-drying oil at a reduced pressure in an inert atmosphere is disclosed. The binding agents are useful in paints and varnishes.

---

The present invention is concerned with new binding agents for paints and varnishes prepared by the reaction of a petroleum resin with a drying oil or a semi-drying oil. The reaction is carried out by heating, preferably in an inert atmosphere, as obtained with the aid of nitrogen.

It has been found necessary to eliminate the cracking products that form in the course of the reaction such as acrolein, fatty acids, unsaturated hydrocarbons, etc., for these materials may act as reaction inhibitors; their presence in the reacting medium leads also to a considerable decrease in viscosity, an increase in the acid number and a deterioration in the colour of the copolymer obtained.

It has now been discovered that these drawbacks can be avoided if the atmosphere over the reacting mixture is continuously renewed by a stream of an inert gas.

However, on an industrial scale, this requirement involves a considerable consumption of inert gas, which may be costly.

In accordance with the present invention it is possible to obtain binding agents having improved characteristics without a high consumption of inert gas by performing the heating operation under reduced pressure.

The pressure may be reduced to any desired extent, but it is generally advisable to operate at pressure between 50 and 10 mm. Hg.

The following examples illustrate specific embodiments of the invention:

Example I

A petroleum resin R and a raw linseed oil were used as the starting materials.

The petroleum resin R had been obtained by polymerisation, in the presence of $AlCl_3$, of light naphtha derived from the steam-cracking of a petroleum distillate. It had the following characteristics:

Ball-ring softening point _____ °C__ 100
Molecular weight (approximately) _____ 1400
Gardner colour (50% solution in toluene) _____ 11

The operation was conducted on a batch of 100 kg. comprising 30 kg. of resin R and 70 kg. of linseed oil. The reactants were heated for 10 hours at 295° C. by five different methods, i.e.

(a) In a stream of nitrogen at a rate leading to a total nitrogen consumption of 15 to 20 CBM
(b) In a stream of nitrogen totalling 7 CBM
(c) In an inert atmosphere without a stream of nitrogen
(d) At reduced pressure of 25 mm. mercury without a stream of nitrogen
(e) At reduced pressure of 25 mm. mercury in a stream of nitrogen totalling 0.6 CBM.

The following results were obtained:

|  | a | b | c | d | e |
|---|---|---|---|---|---|
| Percent loss (weight) | 5 | 2.9 | 8 | 3 | 5 |
| Viscosity of binding agent | 1,100 | 800 | 380 | 850 | 1,100 |
| Acid number | 2.7 | 5.7 | 10 | 5.2 | 2.6 |
| Gardner colour (ASTM D 154 test using a 50% solution of binding agent in toluene) | 6— | 7 | 7.5 | 6.5 | 5.5 |

It can be seen that the product e has the same characteristics as product a, but with a nitrogen consumption of 0.6 CBM instead of 15 to 20 CBM per 100 kg. treated products.

Example II

Using the same starting materials as above, there was formed a batch consisting of 50 kg. petroleum resin R and 50 kg. raw linseed oil.

Heating took place at 295° C. for 7½ hours by the five methods of operation described in Example I, but the consumption of nitrogen in case e was 0.5 CBM instead of 0.6 CBM. The following results were obtained:

|  | a | b | c | d | e |
|---|---|---|---|---|---|
| Viscosity of binding agent (poises at 25° C) | 1,100 | 600 | 360 | 800 | 1,200 |
| Acid number | 2.5 | 5.6 | 7.5 | 4.3 | 2.3 |
| Gardner colour (ASTM test 154–50, using a solution of 50% by weight of binding agent in toluene) | 8 | 9+ | 9.5 | 9— | 8— |

The tests show that at a pressure of 25 mm. mercury, there is obtained, with a consumption of 0.5 CBM of nitrogen, a product comparable with that requiring 15 to 20 CBM of nitrogen at normal pressure.

The petroleum resins suitable for use in the practice of the present invention may be prepared by the polymerization under the action of a Friedel-Crafts catalyst of unsaturated petroleum refinery streams containing various mixtures of olefins and diolefins. Hydrocarbon mixtures obtained by steam-racking petroleum oils are particularly suitable for this purpose.

The preparation of representative petroleum resins is described in greater detail in many U.S. patents, including U.S. Patents 2,865,900; 2,856,389; 2,734,046; 2,753,325; 2,754,288; 2,758,988; 2,798,865; and 2,894,937, whose disclosure is incorporated herein by reference.

Drying oils or semi-drying oils which may be reacted with the above petroleum resins to produce the binding agents of the present invention include linseed oil, tung oil, dehydrated castor oil, soyabean oil and the like.

In making the binding agents of the present invention, the components, petroleum resin and drying oil or semi-drying oil, are heated together at a temperature and for a period of time sufficient to complete the reaction. The reaction temperature is not particularly critical but it is generally advisable to operate at temperatures between 200° and 400° C. An especially preferred temperature range is 280° to 310° C. According to the present invention, the reaction is effected in an inert atmosphere at reduced pressure, pressures between 50 mm. and 10 mm. Hg being particularly preferred. The inert atmosphere can be provided most conveniently by passing an inert gas such as nitrogen through the reacting mixture.

The proportions of the reactants may be varied within wide limits but generally 5 to 80% by weight of petroleum resin are reacted with 95 to 20% by weight of drying oil or semi-drying oil.

The binding agents of the present invention can be used under the same conditions and in the same formulations as conventional paint and varnish binders.

While specific embodiments of the invention have been described above it is to be understood that changes may be made without departing from the scope of the present invention.

What is claimed is:

1. A process for making binding agents suitable for use in paints and varnishes which comprises heating 5 to 80 wt. percent of a petroleum resin with 95 to 20 wt. percent of a drying oil or semi-drying oil in an inert atmosphere at a pressure between 10 and 50 mm. Hg, and at a temperature between 200° and 400° C.

2. A process as defined in claim 1 wherein said inert atmosphere is provided by passing an inert gas through the reacting mixture.

3. A process as defined in claim 2 wherein the inert gas is nitrogen.

4. A process as defined in claim 3 wherein the total nitrogen consumption is of the order of 0.5 to 0.6 m.$^3$ per 100 kg. of reacting mixture.

References Cited

UNITED STATES PATENTS

| | | | |
|---|---|---|---|
| 2,709,662 | 5/1955 | Koenecke et al. | 106—265 |
| 2,880,188 | 3/1959 | McKay | 260—23.7 |

DONALD E. CZAJA, Primary Examiner

R. A. WHITE, Assistant Examiner

U.S. Cl. X.R.

260—8